United States Patent
Hair et al.

(10) Patent No.: US 12,218,327 B2
(45) Date of Patent: Feb. 4, 2025

(54) BATTERY HEATING VIA HEAT COLLECTED FROM COOLANT PASSING THROUGH HOLLOW WINDINGS OF ELECTRIC MACHINE

(71) Applicant: FORD GLOBAL TECHNOLOGIES, LLC, Dearborn, MI (US)

(72) Inventors: Jonathan Hair, Northville, MI (US); Matthew Penne, Pierce, NE (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 126 days.

(21) Appl. No.: 18/190,446

(22) Filed: Mar. 27, 2023

(65) Prior Publication Data
US 2024/0332663 A1 Oct. 3, 2024

(51) Int. Cl.
| | | |
|---|---|---|
| *H02K 11/25* | (2016.01) | |
| *H01M 10/625* | (2014.01) | |
| *H01M 10/633* | (2014.01) | |
| *H02K 3/24* | (2006.01) | |
| *H02K 9/193* | (2006.01) | |
| *H02K 11/00* | (2016.01) | |
| *H02K 11/30* | (2016.01) | |
| *H02P 29/64* | (2016.01) | |
| *B60L 58/26* | (2019.01) | |

(52) U.S. Cl.
CPC ....... *H01M 10/633* (2015.04); *H01M 10/625* (2015.04); *H02K 3/24* (2013.01); *H02K 9/193* (2013.01); *H02K 11/0094* (2013.01); *H02K 11/30* (2016.01); *H02P 29/64* (2016.02); *B60L 58/26* (2019.02)

(58) Field of Classification Search
CPC .... H02P 6/21; H02P 6/182; H02P 1/46; H02P 29/60; B24B 23/02
See application file for complete search history.

(56) References Cited

U.S. PATENT DOCUMENTS

| | | | | |
|---|---|---|---|---|
| 2010/0131120 A1* | 5/2010 | Lewis | ............... | G06F 1/206 417/354 |
| 2014/0339932 A1* | 11/2014 | Hossain | ............... | H02K 9/00 165/267 |
| 2016/0344268 A1* | 11/2016 | Tsukamoto | ............ | H02K 11/25 |
| 2018/0083509 A1 | 3/2018 | Yang et al. | | |
| 2018/0091012 A1 | 3/2018 | Yang et al. | | |
| 2019/0070924 A1 | 3/2019 | Mancini et al. | | |

FOREIGN PATENT DOCUMENTS

| | | |
|---|---|---|
| CN | 110329112 A | 10/2019 |
| DE | 102017211303 A1 | 1/2019 |
| JP | 2014082841 A | 5/2014 |

* cited by examiner

*Primary Examiner* — Muhammad S Islam
(74) *Attorney, Agent, or Firm* — David B. Kelley; Brooks Kushman P.C.

(57) ABSTRACT

Responsive to a temperature of a battery being less than a threshold temperature, a controller directs coolant from hollow wires wound within slots of a stator to a coolant circuit for the battery. Responsive to the temperature being greater than the threshold temperature, the controller directs the coolant from the hollow wires back to the hollow wires while bypassing the coolant circuit.

16 Claims, 4 Drawing Sheets

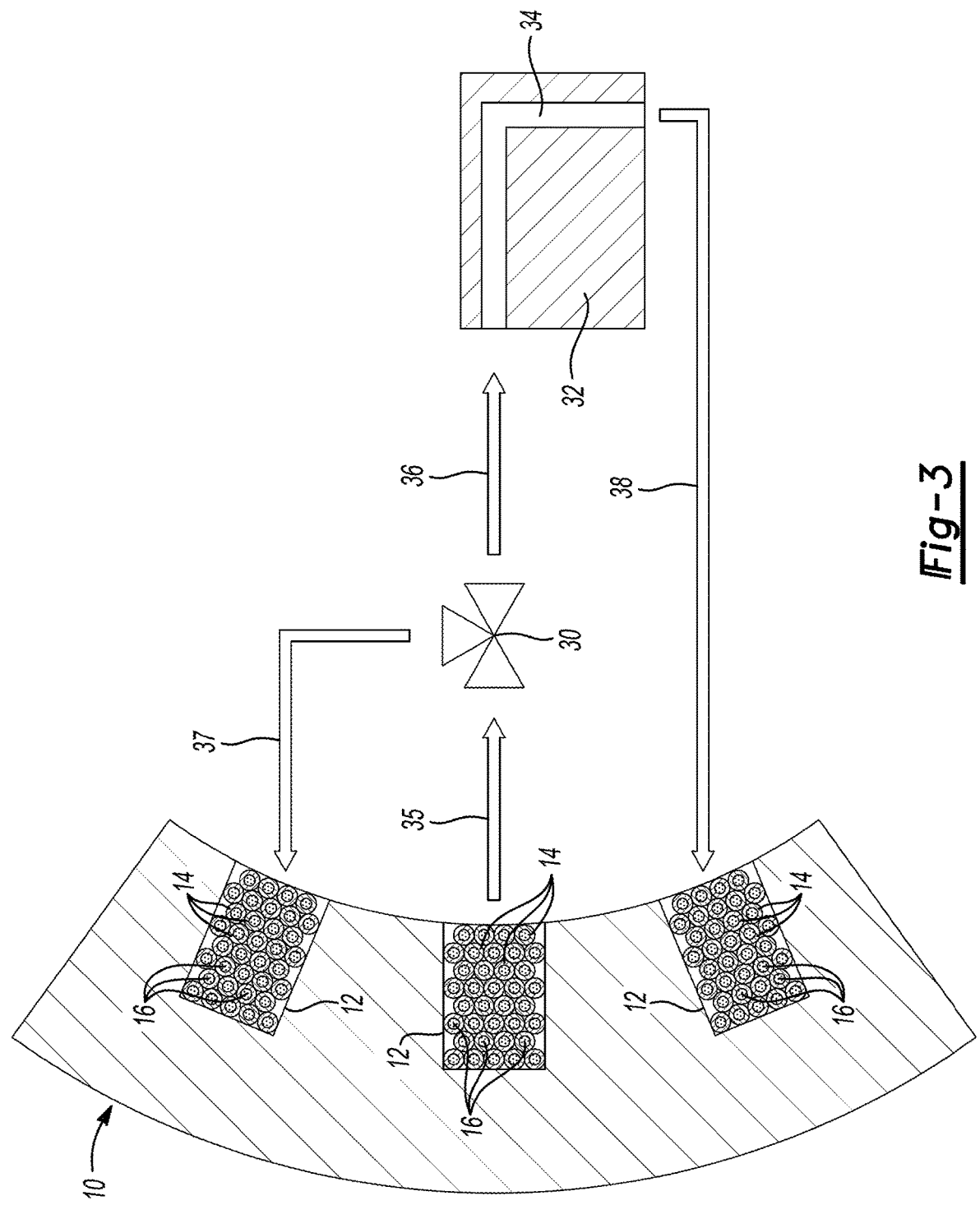

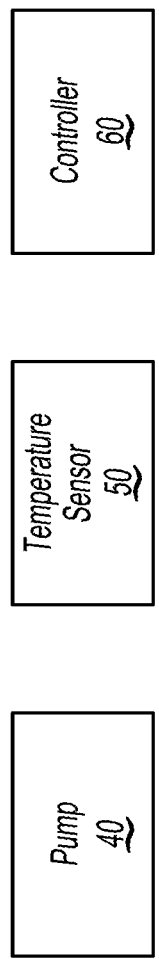
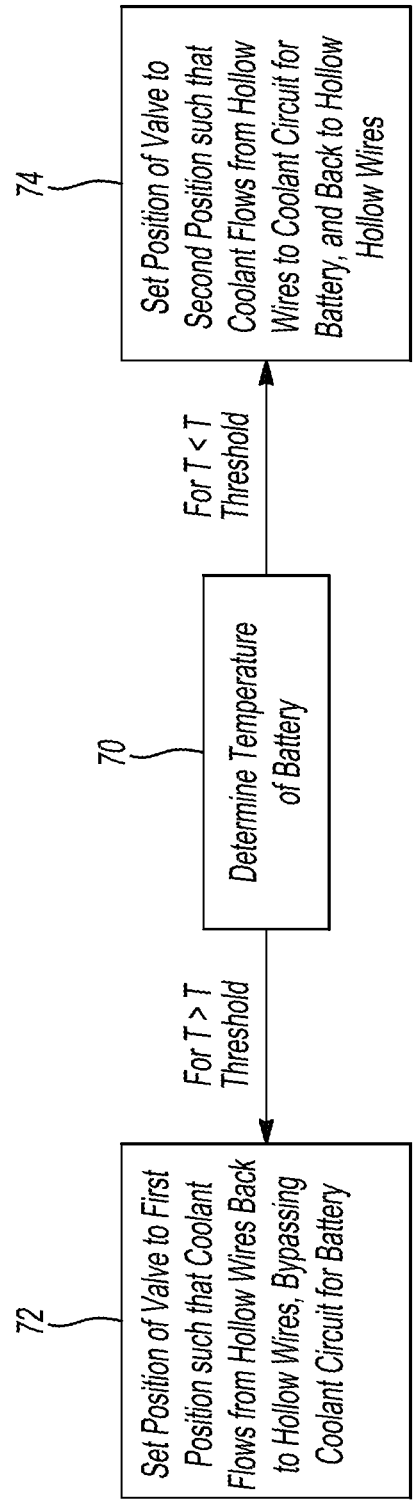

BATTERY HEATING VIA HEAT COLLECTED FROM COOLANT PASSING THROUGH HOLLOW WINDINGS OF ELECTRIC MACHINE

TECHNICAL FIELD

The present disclosure relates to an automotive system for heating the battery of a vehicle using hollow windings with coolant inside, and a valve.

BACKGROUND

Electric and hybrid vehicles include electric machines that are typically powered by traction batteries. The traction batteries may provide high-voltage direct current (DC) as the output. The electric machines may transform this electrical energy to mechanical energy to propel the vehicles. Temperatures of the electric machines may increase during such operation.

SUMMARY

An automotive system includes an electric machine. The electric machine includes a stator. The stator defines slots. A plurality of hollow wires are wound within the slots defined by the stator. A pump drives coolant through the hollow wires to cool the electric machine.

An automotive system includes a controller. The controller, based on a temperature of a battery, selectively directs coolant through a coolant circuit for the battery and hollow windings of an electric machine.

A method includes, responsive to a temperature of a battery being less than a threshold temperature, directing coolant from hollow wires wound within slots of a stator to a coolant circuit for the battery, and responsive to the temperature being greater than the threshold temperature, directing the coolant from the hollow wires back to the hollow wires while bypassing the coolant circuit.

BRIEF DESCRIPTION OF THE DRAWINGS

FIG. 3 illustrates components of a proposed system including some possible coolant paths;

FIG. 4 illustrates a pump;

FIG. 5 illustrates a temperature sensor;

FIG. 6 illustrates a controller; and

FIG. 7. is a flow diagram of an algorithm of operations associated with the proposed system of FIG. 3.

DETAILED DESCRIPTION

Figure 1:
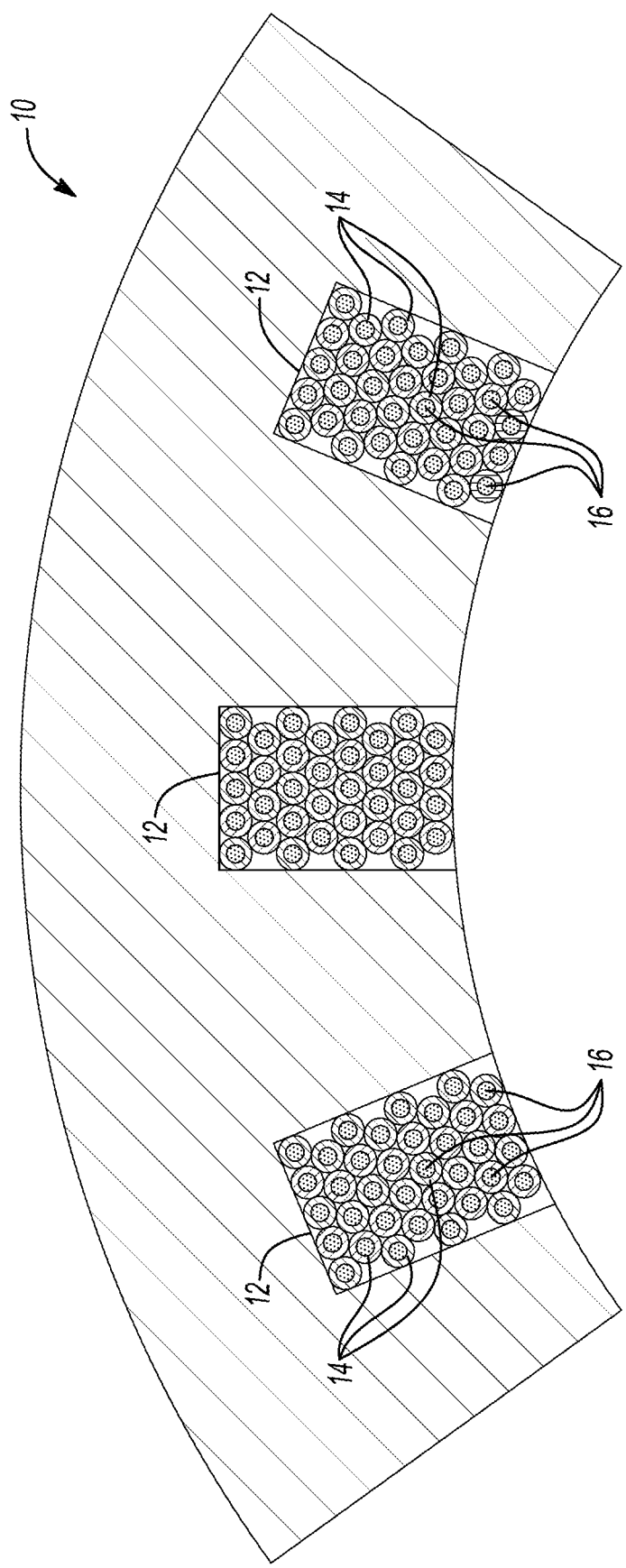
FIG. 1 illustrates a cross-section of a stator and hollow wires.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles such as battery-electric vehicles (BEVs) contain a traction battery assembly to act as an energy source for one or more electric machines. Lithium Iron Phosphate (LFP) batteries may serve as one example of traction batteries. Traction batteries may require heating. Further, electric drive systems of BEVs may not be efficient in producing additional heat to warm the batteries and any coolant.

An automotive system may operate in a "lossy mode." Lossy mode may be when an electric drive system operates less efficiently to produce excess heat for warming a coolant and hence any batteries in fluid communication with the coolant. The heat transfer path in a lossy mode may be long and not sufficiently effective. For instance, in a lossy mode, the heat may flow from an electric machine, through the oil coolant, an oil to antifreeze heat exchanger, a complex coolant hose system, battery module heat exchangers, to the cells of a battery. The heat transfer path may not be ideal, and each step of heat transfer may be subject to losses and thermal resistance. Moreover, when initially designed, the heating or cooling systems and its associated paths in a BEV may not be designed to effectively transfer heat from one component to another.

Studies, empirical data, and tests may suggest changing the effectiveness of the heat transfer path from the motor to the traction battery. For instance, wind tunnel tests and other tests may indicate the effectiveness of a heat transfer path during a lossy mode. Studies suggest that more energy may be required to raise the temperature of an LFP battery, as compared to raising the temperature of another battery chemistry. Therefore, the effectiveness of a heat transfer path may further decrease with LFP batteries and similar batteries, as compared to other batteries. As an example, the effectiveness of the heat transfer path from the motor to the battery may be less than 20%. Therefore, for 3 kW of energy or heat loss in an electric drive system, approximately 600 W may reach the cells of a traction battery.

The proposed arrangements herein may include a system with an electric machine. The electric machine includes a stator that defines slots. A plurality of hollow wires may be wound within the slots defined by the stator. The cross-section of hollow wires may vary. For instance, according to one embodiment, the hollow wires may have rectangular cross-sections. According to another embodiment, the hollow wires have circular cross-sections. Coolant flows through the hollow wires. The heat from the motor may directly heat the coolant in the hollow wires, which may also reduce the amount of heat loss at the motor. A pump may be configured to drive the coolant through the hollow wires.

The arrangements may include hollow motor wires in fluid communication with a control valve. The control valve may be in fluid communication with a battery coolant circuit. The battery coolant circuit may be in fluid communication with the hollow motor wires. The control valve may be configured to selectively direct the coolant.

A controller may be programmed to control the control valve. The controller may control the valve based on several considerations. For instance, the controller may be programmed to control the control valve based on the temperature of the coolant. The controller may also be programmed to control the control valve based on the temperature of the battery. For example, when the temperature of the battery is determined to be greater than a threshold temperature, the position of the valve may be set to a first position where the coolant may flow from the hollow wires back to the hollow wires, thereby bypassing the battery coolant circuit. Whereas, when the battery temperature is determined to be less than a threshold temperature, the position of the valve may be set to a second position where the coolant may flow from the hollow wires, directly through the battery coolant circuit, and back to the hollow wires. The coolant may also flow back to the hollow wires and the position of the control valve may be set accordingly, when the temperature of the coolant is determined to be less than a threshold temperature.

The arrangements proposed here may have several advantages. It may include hollow motor wires. The heat from the motor may directly heat the coolant in the hollow wires, which may also reduce the amount of heat loss at the motor. During normal operation, the motor wires may be cooled more efficiently as the coolant flows through them. A control valve may determine the flow of the coolant from the motor to the battery coolant circuit. The coolant may flow from inside the hollow wires, through a direct connection and valve, to the battery coolant circuit or back to the hollow wires. Therefore, this may result in bypassing a longer and less effective heat transfer path, and provide for better heat transfer effectiveness. Consequently, the overall performance and torque densities for the motors may also increase. Other advantages may include saving space and other considerations.

| FIG. 1 illustrates the cross-section of a stator 10. The stator 10 defines slots 12. A plurality of hollow wires 14 may be wound within the slots 12. Coolant 16 flows through the hollow wires 14. The coolant 16 may be heated directly by the heat from the electric machine and the motor, which may also reduce the amount of heat lost at the motor.

Electric machines may generate significant heat, particularly because of the traction motor. Motor heat may affect the motor windings, thereby reducing the performance of the motor. Cooling the motor, including various components of the motor, may therefore be helpful. Cooling of the hollow wires 14 may be more efficient because the hollow wires 14 may have the coolant 16 flowing through them. Therefore, the cooling of the motor and performance of the motor may also change.

Figure 2:
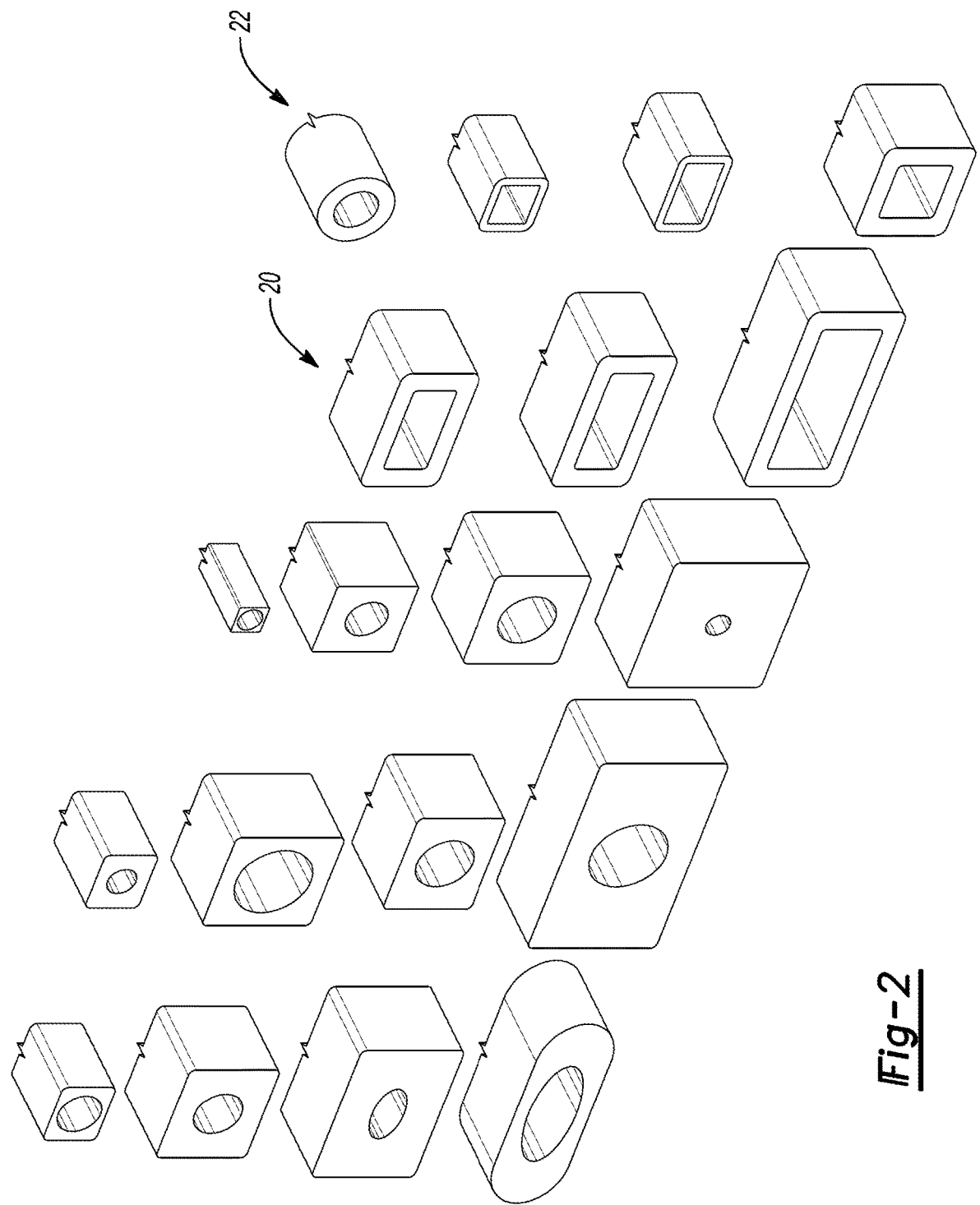
FIG. 2 illustrates various cross sections and shapes for the hollow wires.

FIG. 2 illustrates various shapes and cross-sections, which may be suitable for the hollow wires 14. According to one embodiment, the hollow wires 14 may have a rectangular cross-section 20. According to another embodiment, the hollow wires 14 may have a circular cross-section 22. FIG. 2 illustrates only some of the shapes and cross-sections for the hollow wires 14. Based on the application and suitability, another shape or size may be chosen for the hollow wires 14, including for the cross-section of the hollow wires 14.

FIG. 3 illustrates the basic components of a proposed system including some of the possible coolant paths. FIG. 3 incorporates FIG. 1. FIG. 3 illustrates the cross-section of the stator 10, slots 12, and a plurality of the hollow wires 14 wound within the slots 12. The coolant 16 flows through the hollow wires 14. The hollow wires 14 may be in fluid communication with a valve 30. The valve 30 may be in fluid communication with a traction battery 32. The traction battery 32 may have a battery coolant circuit 34 arranged to cool the traction battery 32. Known sealing technology may be used to facilitate fluid seals between the various components.

The flow of coolant 16 may be determined by the position of the valve 30. The paths taken by the coolant 16 are depicted as solid arrows in FIG. 3. When the valve 30 is set in a first position, the coolant may take path 35 and flow from the hollow wires 14 to the valve 30. While the valve 30 is still in the first position, the coolant may take the path 37 and return to the hollow wires 14. Therefore, when the valve is in the first position, the coolant 16 flows from the hollow wires 14 back to the hollow wires 14, thereby bypassing the coolant circuit 34 of the traction battery 32.

The path for the coolant 16 may differ when the valve 30 is in a second position. The coolant 16 may then take the path 35 and flow from the hollow wires 14 to the valve 30. While the valve 30 is still in the second position, the coolant 16 may then take path 36 and flow directly from the valve 30 to the battery coolant circuit 34. The direct path 36 is shorter than a conventional heat transfer path from a motor to a traction battery, where heat may flow from the electric machine, through the oil coolant, an oil to antifreeze heat exchanger, a complex coolant hose system, battery module heat exchangers, to the cells of a battery. There may be losses and thermal resistance in each step of the conventional heat transfer path. The direct path 36 may change the effectiveness of the heat transfer path from the motor to the traction battery 32. The coolant 16 may also take path 38 and flow from the battery coolant circuit 34 to the hollow wires 14.

FIG. 4 illustrates a pump 40. The pump 40 may be used to pump the coolant from the hollow wires 14 to the battery coolant circuit 34. The pump 40 may also be used to pump the coolant 16 from the battery coolant 34 back to the hollow wires 14. The pump 40 may also be used for suitable circulation of the coolant through the proposed system.

FIG. 5 illustrates a temperature sensor 50. The temperature sensor 50 may determine the temperature of the coolant 16. The temperature sensor 50 may also determine the temperature of the battery 32. The temperature sensor 50 may also determine the temperature of a point along the path 35, 36, 37 or 38, the paths being illustrated in FIG. 3. In one embodiment, a plurality of temperature sensors may be used.

FIG. 6 illustrates a controller 60. The controller 60 may be programmed to control the control valve 30. The controller 60 may be programmed to control the valve 30 based on several considerations. For instance, the controller 60 may be programmed to control the control valve 30 based on the temperature of the coolant 16, determined by the temperature sensor 50. The controller 60 may also be programmed to control the control valve 30 based on the temperature of the battery 32, determined by the temperature sensor 50.

FIG. 7 is a flow diagram illustrating some of the operations of the proposed system. In step 70, the temperature sensor 50 determines the temperature of the battery 32. The temperature of the battery 32 may be determined to be greater than a threshold temperature. In step 72, when the temperature of the battery 32 is greater than a threshold temperature, the position of the valve 30 is set to a first position such that the coolant 16 flows from the hollow wires 14 back to the hollow wires 14, bypassing the battery coolant circuit 34. The temperature of the battery 32 may also be determined to be lower than a threshold temperature. Therefore, in step 74, when the temperature of the battery 32 is lower than a threshold temperature, the position of the valve 30 is set to a second position such that the coolant 16 flows from the hollow wires 14 to the battery coolant circuit 34, and back to the hollow wires 14. The coolant 16 may also flow from the hollow wires 14 through the control valve 30, and directly to the battery coolant circuit 34. The direct path taken by coolant 16 may bypass a less effective heat transfer path, and provide for better heat transfer effectiveness.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of these disclosed materials. The terms "controller" and "controllers," for example, can be used interchangeably herein.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An automotive system comprising:
   an electric machine including a stator defining slots and a plurality of hollow wires wound within the slots; and
   a pump configured to drive coolant through the hollow wires to cool the electric machine.

2. The automotive system of claim 1 further comprising a battery coolant circuit and a valve configured to selectively direct the coolant to the hollow wires or the battery coolant circuit.

3. The automotive system of claim 2 further comprising a battery, wherein the battery coolant circuit is arranged to cool the battery.

4. The automotive system of claim 3 further comprising a controller programmed to control the valve based on a temperature of the battery.

5. The automotive system of claim 4 further comprising a controller programmed to control the valve based on a temperature of the coolant.

6. The automotive system of claim 4, wherein the controller is further programmed to control the valve to direct the coolant exiting the hollow wires back to the hollow wires while bypassing the battery coolant circuit.

7. The automotive system of claim 4, wherein the controller is further programmed to control the valve to direct the coolant exiting the hollow wires through the battery coolant circuit and back to the hollow wires.

8. The automotive system of claim 1, wherein the hollow wires have rectangular cross-sections.

9. The automotive system of claim 1, wherein the hollow wires have circular cross-sections.

10. An automotive system comprising:
    a controller programmed to, based on a temperature of a battery, selectively direct coolant through a coolant circuit for the battery and hollow windings of an electric machine.

11. The automotive system of claim 10, wherein the controller is further programmed to set a position of a valve in fluid communication with a coolant circuit and the hollow windings.

12. The automotive system of claim 11, wherein the hollow windings have a circular or square cross-section.

13. The automotive system of claim 11, wherein the controller is further programmed to set the position based on a temperature of the coolant.

14. A method comprising:
    responsive to a temperature of a battery being less than a threshold temperature, directing coolant from hollow wires wound within slots of a stator to a coolant circuit for the battery; and
    responsive to the temperature being greater than the threshold temperature, directing the coolant from the hollow wires back to the hollow wires while bypassing the coolant circuit.

15. The method of claim 14, wherein the directing coolant from hollow wires wound within slots of a stator to a coolant circuit for the battery includes setting a position of a valve.

16. The method of claim 14, wherein the directing the coolant from the hollow wires back to the hollow wires while bypassing the coolant circuit includes setting a position of a valve.

* * * * *